(12) United States Patent
Kita et al.

(10) Patent No.: US 12,351,330 B2
(45) Date of Patent: Jul. 8, 2025

(54) AIRCRAFT PROPULSION SYSTEM WITH REDUCED ROTATIONAL LOAD OF AN ENGINE SHAFT

(71) Applicant: HONDA MOTOR CO., LTD., Tokyo (JP)

(72) Inventors: Akinori Kita, Wako (JP); Takeshi Matsumoto, Wako (JP); Daiko Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 17/537,546

(22) Filed: Nov. 30, 2021

(65) Prior Publication Data
US 2022/0194577 A1 Jun. 23, 2022

(30) Foreign Application Priority Data
Dec. 22, 2020 (JP) ................. 2020-212826

(51) Int. Cl.
*B64D 35/02* (2024.01)
*B64D 27/10* (2006.01)
(Continued)

(52) U.S. Cl.
CPC ............. *B64D 35/02* (2013.01); *B64D 27/10* (2013.01); *B64D 27/24* (2013.01); *B64D 31/00* (2013.01);
(Continued)

(58) Field of Classification Search
None
See application file for complete search history.

(56) References Cited

U.S. PATENT DOCUMENTS 8,727,271 B2 5/2014 Salyer
9,493,245 B2 11/2016 Salyer
(Continued)

FOREIGN PATENT DOCUMENTS

CN 107878762 4/2018
CN 109421927 3/2019
(Continued)

OTHER PUBLICATIONS

Japanese Office Action for Japanese Patent Application No. 2020-212826 mailed Aug. 29, 2023.
(Continued)

*Primary Examiner* — Gerald L Sung
*Assistant Examiner* — Jacek Lisowski
(74) *Attorney, Agent, or Firm* — Amin, Turocy & Watson, LLP (57) ABSTRACT

An aircraft propulsion system capable of reducing a rotational load of an engine shaft is provided. An aircraft propulsion system includes a plurality of engines (60-1 and 60-2) and a controller (100). When a flight state is a first state, the controller (100) causes some of the plurality of engines (60-1 and 60-2) to operate while stopping the remaining engine. At least one engine (60-1) of the plurality of engines (60-1 and 60-2) includes a bleed air hole (71-1), a bleed air pipe (72-1), and a bleed air valve (73-1). When causing the engine (60-2) which has stopped to start up again, the controller (100) opens a bleed air valve (73-1) in the engine (60-1) which is in operation and supplies compressed air of the compressor (62-1) to the compression chamber (64-2) of the engine (60-2) which has stopped.

5 Claims, 4 Drawing Sheets (51) Int. Cl.
  *B64D 27/24* (2006.01)
  *B64D 31/00* (2006.01)
  *B64U 30/20* (2023.01)
  *B64U 50/32* (2023.01)
  *B64U 10/14* (2023.01)
  *B64U 50/19* (2023.01)

(52) U.S. Cl.
  CPC ............ *B64U 30/20* (2023.01); *B64U 50/32* (2023.01); *B64U 10/14* (2023.01); *B64U 50/19* (2023.01)

(56) References Cited

U.S. PATENT DOCUMENTS

| | | | |
|---|---|---|---|
| 10,766,629 B2 * | 9/2020 | Mercier-Calvairac | F02C 9/42 |
| 2007/0006592 A1 | 1/2007 | Balan et al. | |
| 2010/0326085 A1 * | 12/2010 | Veilleux | F01D 1/06 |
| | | | 60/778 |
| 2017/0016399 A1 * | 1/2017 | Bedrine | F02C 6/08 |
| 2017/0233089 A1 | 8/2017 | Zaccaria et al. | |
| 2017/0247114 A1 | 8/2017 | Moulon et al. | |
| 2017/0305541 A1 | 10/2017 | Vallart et al. | |
| 2018/0045068 A1 * | 2/2018 | Brinson | B64D 13/06 |
| 2018/0354631 A1 * | 12/2018 | Adibhatla | B64D 35/08 |
| 2018/0363564 A1 | 12/2018 | Geneste | |
| 2018/0370651 A1 * | 12/2018 | Miller | B64D 27/12 |
| 2019/0002115 A1 * | 1/2019 | Miller | B64D 27/24 |
| 2019/0061932 A1 | 2/2019 | Kita | |
| 2020/0148376 A1 | 5/2020 | Kawai | |
| 2020/0362720 A1 * | 11/2020 | Klemen | B64D 27/24 |
| 2020/0378314 A1 * | 12/2020 | Ng | F02C 9/18 |

FOREIGN PATENT DOCUMENTS

| | | |
|---|---|---|
| CN | 111137460 | 5/2020 |
| JP | 60-170036 | 11/1985 |
| JP | 2007-016787 | 1/2007 |
| JP | 2010-071261 | 4/2010 |
| JP | 2012-505113 | 3/2012 |
| JP | 2017-531598 | 10/2017 |
| WO | 2010/042218 | 4/2010 |
| WO | 2016/059320 | 4/2016 |

OTHER PUBLICATIONS

Chinese Office Action for Chinese Patent Application No. 202111389921.8 mailed Mar. 28, 2024.

* cited by examiner

AIRCRAFT PROPULSION SYSTEM WITH REDUCED ROTATIONAL LOAD OF AN ENGINE SHAFT

CROSS-REFERENCE TO RELATED APPLICATION

Priority is claimed on Japanese Patent Application No. 2020-212826, filed Dec. 22, 2020, the content of which is incorporated herein by reference.

BACKGROUND OF THE INVENTION

Field of the Invention

The present invention relates to an aircraft propulsion system.

Description of Related Art

In the related art, aircraft propulsion systems in which a plurality of engines are attached to an aircraft main body and an electric generator is connected to the engines are known (for example, Patent Document 1 (the specification of U.S. Pat. No. 8,727,271) and Patent Document 2 (the specification of U.S. Pat. No. 9,493,245)). In these aircraft propulsion systems, the electric power supplied to the electric generator and/or the electric power supplied to a storage battery is supplied to an electric motor and the electric motor drives a plurality of rotors.

SUMMARY OF THE INVENTION

In this type of aircraft propulsion system, from the viewpoint of power generation efficiency, it is conceivable to stop a part of an electric generator in some cases (for example, at the time of cruising with a small electric power load).

However, in this case, if an engine is kept stopped for a long period of time, a temperature of the engine will decrease. As a result, at the time of starting up the engine which has stopped again, a load for rotating an engine shaft increases, and for example, it may be necessary to supply a large amount of electric power to a starter motor. Thus, there is a concern concerning the power consumption and the like which will increase. The engine needs to start-up again, for example, when an engine which is in operation breaks down, at the time of landing with a high electric power load, and the like.

The present invention was made in consideration of such circumstances, and an object of the present invention is to provide an aircraft propulsion system capable of reducing a rotational load of an engine shaft.

An aircraft propulsion system according to the present invention has the following constitutions.

(1) An aircraft propulsion system according to an aspect of the present invention includes: a plurality of engines attached to an airframe of an aircraft; an electric generator connected to an engine shaft of each of the engines; a plurality of electric motors driven using an electric power including an electric power generated by the electric generator; a plurality of rotors attached to the airframe of the aircraft and driven using a driving force output by the electric motor; and a controller which controls an operation state of the plurality of engines, in which, when a flight state of the aircraft is a first state after the plurality of engines have been made to operate and the aircraft has taken off, the controller causes some of the plurality of engines to operate while stopping the remaining engines, wherein at least one engine of the plurality of engines includes: a bleed air hole provided in the compressor; a bleed air pipe extending from the bleed air hole to a compression chamber of another engine; and a bleed air valve provided in the bleed air pipe, and when an engine which has stopped is made to start up again, the controller opens the bleed air valve in an engine which is in operation and supplies compressed air of the compressor in the engine which is in operation to the compression chamber of the engine which has stopped through the bleed air hole and the bleed air pipe.

(2) In the aircraft propulsion system according to the above aspect (1), the engine which has stopped may start up again using, as a driving force, only the compressed air supplied from the engine which is in operation to the compression chamber.

(3) In the aircraft propulsion system according to the above aspect (1) or (2), the aircraft propulsion system may further include: a starter motor which rotates the engine shaft, wherein the engine which has stopped may start up again using, as a driving force, both of the compressed air supplied from the engine which is in operation to the compression chamber and the starter motor.

(4) In the aircraft propulsion system according to any one of the above aspects (1) to (3), a first engine and a second engine may be provided as the plurality of engines, the bleed air pipe of the first engine may connect the compressor of the first engine and the compression chamber of the second engine, and the bleed air pipe of the second engine may connect the compressor of the second engine and the compression chamber of the first engine.

(5) In the aircraft propulsion system according to any one of the above aspects (1) to (4), the aircraft propulsion system may further include: an acquisition unit which acquires flight information associated with flight of the aircraft, wherein the controller may control an operation state of the plurality of engines based on the flight information acquired by the acquisition unit.

(6) In the aircraft propulsion system according to any one of the above aspects (1) to (5), the first state may be a state in which the aircraft reaches a prescribed altitude and then moves in a direction including a horizontal direction.

(7) In the aircraft propulsion system according to any one of the above aspects (1) to (6), when a flight state of the aircraft is a second state different from the first state, the controller may cause the plurality of engines to operate to control the aircraft.

In the present invention, when the controller starts up the engine which has stopped again, a bleed air valve in the engine which is in operation is opened and compressed air of the compressor in the engine which is in operation is supplied to the compression chamber of the engine which has stopped through a bleed air hole and a bleed air pipe. Therefore, the compressed air compressed by the compressor in the engine which is in operation is supplied to the compression chamber of the engine which has stopped. Thus, for example, it is possible to supply compressed air to the compression chamber without rotating the engine shaft using the starter motor in the engine which has stopped. Accordingly, it is possible to reduce a rotational load of the engine shaft. As a result, when the engine and the starter motor are utilized together, it is possible to shorten a time required for starting up the engine again. It is also possible to start up the engine again without utilizing the engine and the starter motor together. In this case, it can be said that a bleed air mechanism functions as an engine restart-up mechanism for starting up the engine again without the starter motor.

According to the aspects (1) to (7), it is possible to reduce a rotational load of an engine shaft.

DETAILED DESCRIPTION OF THE INVENTION

Embodiments of an aircraft propulsion system of the present invention will be described below with reference to the drawings.
[Overall Constitution]

Figure 1:
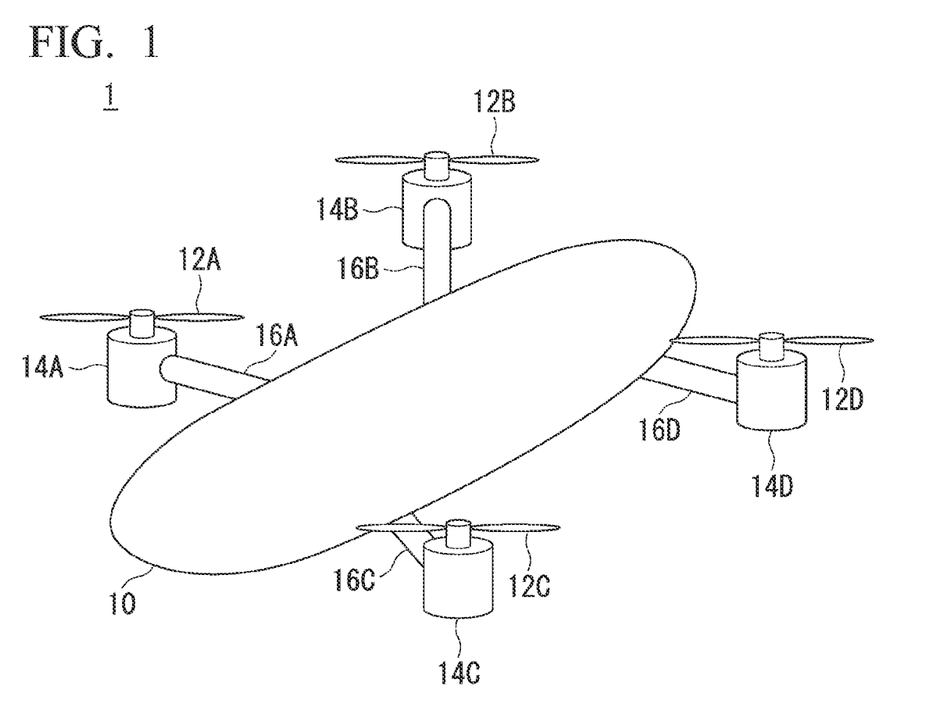
FIG. 1 is a schematic diagram of a flying body 1 having an aircraft propulsion system installed therein.

FIG. 1 is a schematic diagram of a flying body 1 (an aircraft in the claims) having an aircraft propulsion system installed therein. The flying body 1 includes, for example, an airframe 10, a plurality of rotors 12A to 12D, a plurality of electric motors 14A to 14D, and arms 16A to 16D. Hereinafter, when the plurality of rotors 12A to 12D are not distinguished from each other, the rotors 12A to 12D are referred to as a "rotor 12" and when the plurality of electric motors 14A to 14D are not distinguished from each other, the electric motors 14A to 14D are referred to as an "electric motor 14." The flying body 1 may be a manned flying body or an unmanned flying body. The flying body 1 is not limited to a multi-copter shown in the drawing and may be a helicopter or a compound type flying body including both rotary wings and fixed wings.

The rotor 12A is attached to the airframe 10 via the arm 16A. The electric motor 14A is attached to a base portion (a rotating shaft) of the rotor 12A. The electric motor 14A drives the rotor 12A. The electric motor 14A is, for example, a brushless DC motor. The rotor 12A is a fixed wing of a blade which rotates around an axial line parallel to a direction of gravity when the flying body 1 is in a horizontal attitude. The rotors 12B to 12D, the arms 16B to 16D, and the electric motors 14B to 14D also have the same functional constitution as described above, and thus a description thereof will be omitted.

When the rotor 12 rotates in accordance with a control signal, the flying body 1 flies in a desired flight state. The control signal is a signal for controlling the flying body 1 based on an operator's operation or an instruction in autopilot. For example, the flying body 1 flies by rotating the rotor 12A and the rotor 12D in a first direction (for example, clockwise) and rotating the rotor 12B and the rotor 12C in a second direction (for example, counterclockwise). In addition to the rotor 12 described above, an auxiliary rotor or the like for maintaining an attitude or for horizontal propulsion (not shown) may be provided.

Figure 2:
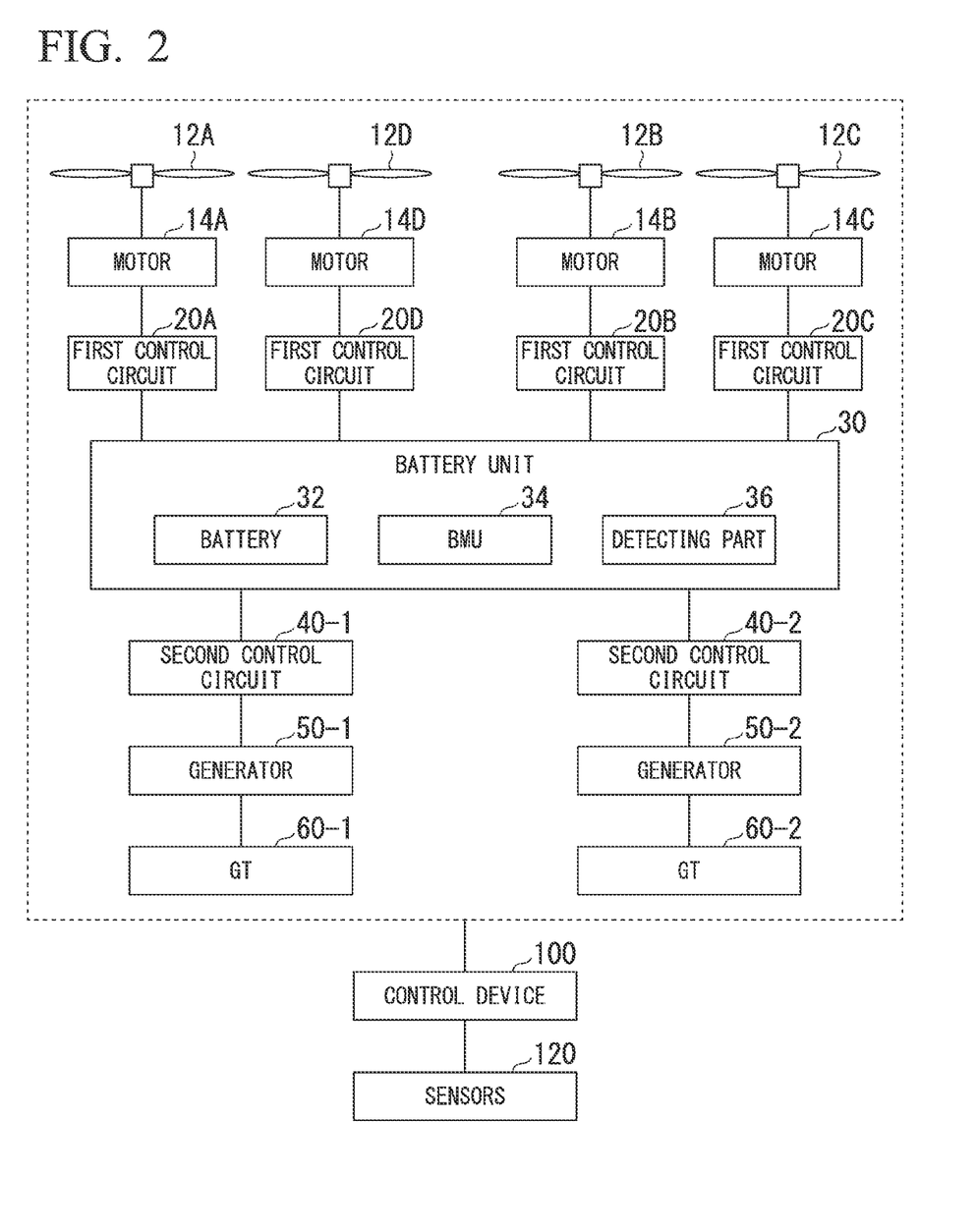
FIG. 2 is a diagram showing an example of a functional constitution of the flying body 1.

FIG. 2 is a diagram showing an example of functional constitution of the flying body 1. In addition to the constitution shown in FIG. 1, the flying body 1 includes, for example, first control circuits 20A, 20B, 20C, and 20D, a storage battery unit 30, second control circuits 40-1 and 40-2, electric generators 50-1 and 50-2, and gas turbine engines (hereinafter referred to as a "GT") 60-1 and 60-2. The constitution in which the number "1" has been added after reference numerals and hyphens is a first constitution corresponding to the rotor 12A, the rotor 12D, the electric motor 14A, the electric motor 14D, the first control circuit 20A, and the first control circuit 20D. The constitution to which the number "2" after reference numeral and the hyphen is added is a second constitution corresponding to the rotor 12B, the rotor 12C, the electric motor 14B, the electric motor 14C, the first control circuit 20B, and the first control circuit 20C. The first constitution will be described below as a representative. In addition, since the second constitution is the same as the first constitution, a description thereof will be omitted.

The first control circuit 20A is a power drive unit (PDU) including a drive circuit such as an inverter. The first control circuit 20A supplies an electric power obtained by converting an electric power supplied by the storage battery unit 30 through switching or the like to the electric motor 14A. The first control circuit 20D is a PDU like the first control circuit 20A and supplies an electric power supplied by the storage battery unit 30 to the electric motor 14D. The electric motor 14A drives the rotor 12A and the electric motor 14D drives the rotor 12D.

The storage battery unit 30 includes, for example, a storage battery 32, a battery management unit (BMU) 34, and a detecting part 36. The storage battery 32 is, for example, an assembled battery obtained by connecting a plurality of battery cells in series, parallel, or series-parallel. The battery cells constituting the storage battery 32 are, for example, a secondary battery such as a lithium-ion battery (LIB) or a nickel hydride battery which is capable of repeatedly performing charging and discharging.

The BMU 34 performs cell balancing, abnormality detection of the storage battery 32, derivation of a cell temperature of the storage battery 32, derivation of a charge/discharge current of the storage battery 32, estimation of an SOC of the storage battery 32, and the like. The detecting part 36 is a voltage sensor, a current sensor, a temperature sensor, or the like for measuring a charging state of the storage battery 32. The detecting part 36 outputs the measurement results such as the measured voltage, current, and temperature to the BMU 34.

The flying body 1 may include a plurality of storage battery units 30. For example, the storage battery unit 30 corresponding to each of the first constitution and the second constitution may be provided. Although the electric power generated by the electric generator 50 is supplied to the storage battery 32 in the embodiment, the present invention is not limited thereto. The electric power generated by the electric generator 50 may be supplied to the first control circuits 20 and the electric motors 14 without going through the storage battery 32 (or selectively through the storage battery 32).

The second control circuit 40-1 is a power conditioning unit (PCU) including a converter and the like. The second control circuit 40-1 converts an alternating current (AC) electric power generated by the electric generator 50-1 into a direct current (DC) electric power and supplies the converted electric power to the storage battery 32 and/or the first control circuits 20.

The electric generator 50-1 is connected to an output shaft of the GT 60-1 (an engine in the claims). The electric generator 50-1 is driven by operating the GT 60-1 and an AC electric power is generated through this driving. The electric generator 50-1 may be connected to the output shaft of the GT 60-1 via a speed-reduction mechanism. The electric generator 50-1 may function as a motor, and when the supply of fuel to the GT 60-1 stops, the GT 60-1 may rotate (idle) such that it can be brought into an operational. At that time, the second control circuit 40-1 can take out an electric power from the storage battery 32 side to motor the electric generator 50-1. Instead of the functional constitution described above, a starter motor 67-1 which will be described later may be connected to the output of the GT 60-1 and the starter motor 67-1 may make the GT 60-1 operational.

The GT 60-1 is, for example, a turboshaft engine. A detailed constitution of the GT 60-1 will be described later.

A control device 100 (a controller in the claims) is realized using, for example, a program (software) executed by a hardware processor such as a central processing unit (CPU). Some or all of functions of the control device 100 may be realized through hardware (a circuit unit; including a circuitry) such as a large scale integration (LSI), an application specific integrated circuit (ASIC), a field-programmable gate array (FPGA), and a graphics processing unit (GPU) or may be realized in cooperation of software and hardware. The program may be stored in advance in a storage device (a storage device including a non-transient storage medium) such as a hard disk drive (HDD) or a flash memory of the control device 100. Alternatively, the program may be stored in a removable storage medium such as a DVD or a CD-ROM, and when the storage medium (non-transient storage medium) is installed in a drive device, the program may be installed in an HDD or a flash memory of the control device 100.

Various sensors 120 (an acquisition unit in the claims) include, for example, a rotation speed sensor, a plurality of temperature sensors, a plurality of pressure sensors, a lubricating oil sensor, an altitude sensor, and a gyro sensor, or the like. The rotation speed sensor detects a rotation speed of a turbine. The temperature sensors each detect a temperature near an intake port of the GT 60 and a temperature immediately downstream of a combustion chamber. The lubricating oil sensor detects a temperature of lubricating oil supplied to a bearing or the like of the GT 60. The pressure sensors each detect a pressure inside a container which accommodates the control device 100 and a pressure near the intake port of the GT 60. The altitude sensor detects an altitude of the flying body 1. The gyro sensor detects an attitude of the airframe 10.

The control device 100 controls the electric motors 14, the first control circuits 20, the storage battery unit 30, the second control circuits 40, the electric generators 50, the GT 60, and the like which have been described above based on operation states thereof or information acquired from the various sensors 120. For example, the control device 100 controls each of the functional constitutions described above to cause the flying body 1 to take off or land or cause the flying body 1 to fly in a prescribed flight state.

The control device 100 controls the flying body 1 based on flight information. The flight information is, for example, information obtained from the detection results of the various sensors 120 and a flight state of the flying body 1 according to a control signal. When the flight state of the flying body 1 is a first state in which a plurality of GTs 60 are operating and the flying body 1 has taken off, the control device 100 causes at least one GT 60 of the plurality of GTs 60 to stop, causes the other GTs 60 which have not stopped to operate, for example, within an efficient operation range in which the other GTs 60 can operate efficiently, and causes an electric power to be output to the electric generators 50 corresponding to the other GTs 60. When the flight state of the flying body 1 is a second state different from the first state, the control device 100 controls the flying body 1 by causing the plurality of GTs 60 to operate.

Figure 3:
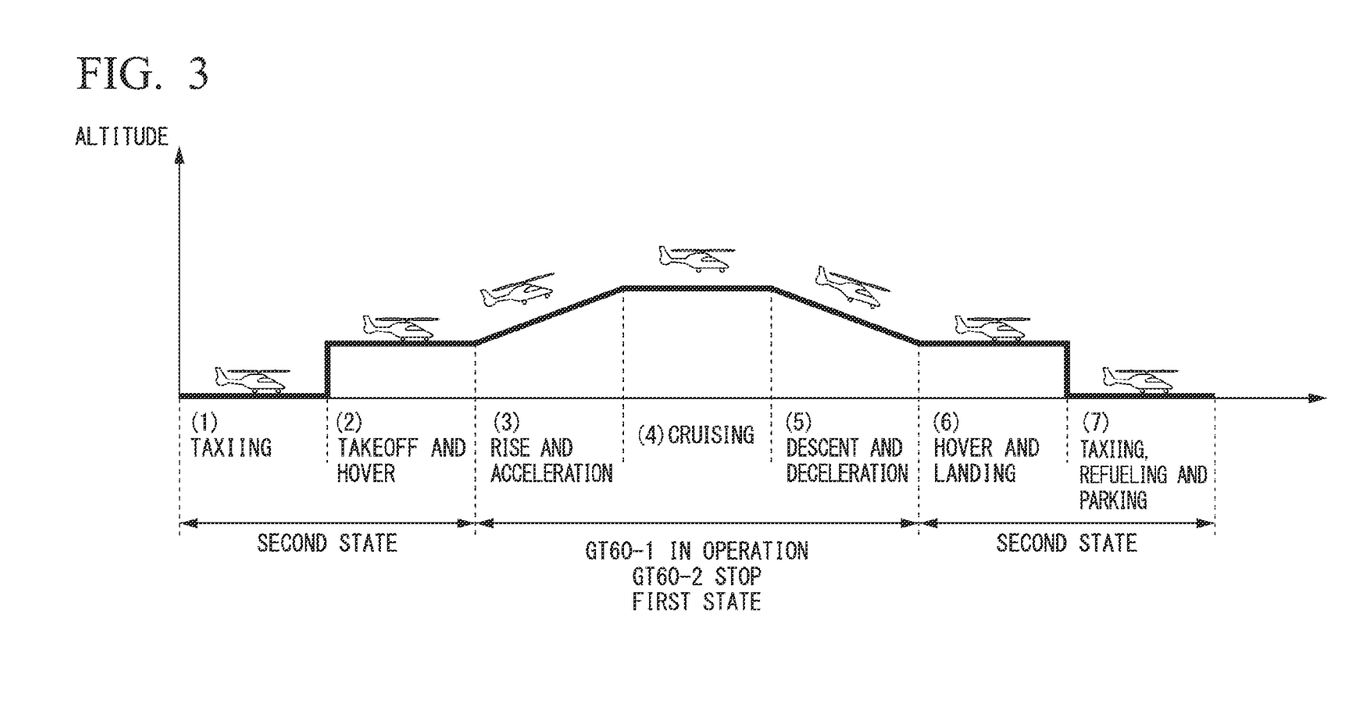
FIG. 3 is a diagram for explaining a flight state of the flying body 1.

FIG. 3 is a diagram for explaining a flight state of the flying body 1. As shown in FIG. 3, the flying body 1 (1) taxies, (2) takes off, hovers (is made to hover), (3) rises and accelerates, and (4) cruises. Moreover, the flying body 1 (5) descends and decelerates, (6) hovers, lands, (7) taxies, is fueled again, and parked. A state in which the flying body 1 reaches a prescribed altitude and then moves in a direction including a horizontal direction is the first state. The first state is, for example, a state in which the flying body 1 cruises shown in FIG. 3 or states in which the flying body 1 rises shown in FIG. 3, accelerates, cruises, descends, and decelerates (3) to (5) shown in FIG. 3. In the following description, the first state is assumed to be a state in which the flying body 1 rises, accelerates, cruises, descends, and decelerates. For example, a state in which the flying body 1 takes off or lands and states in which the flying body 1 taxies, is fueled again, and is parked (1), (2), (6), and (7) are included in the second state.

Among the flight states described above, for example, when the flying body 1 takes off, hovers, or lands (in the case of being in the second state), the control device 100 causes the GT 60-1 and the GT 60-2 to operate within an efficient operation range. An electric power output when the GT 60-1 and the GT 60-2 are operating within an efficient operation range is an electric power equal to or more than a required electric power or close to a required electric power in a state in which the flying body 1 is taking off, hovering, or landing.

Among the flight states described above, for example, when the flying body 1 rises, accelerates, and cruises, or descends and decelerates (in the case of being in the first state), the control device 100 causes the GT 60-1 to operate within the efficient operation range and causes the GT 60-2 to stop. An electric power output when the GT 60-1 operates within the efficient operation range is an electric power equal to or more than a required electric power or close to the required electric power in a state in which the flying body 1 rises, accelerates, and cruises or descends and decelerates. The GT 60-1 and the GT 60-2 have, for example, specifications which satisfy the above conditions.

The required electric power is an electric power required for the flying body 1 so that the flying body 1 transitions to a flight state according to a control signal or is maintained in a flight state. The control device 100 controls the flying body 1 so that the flying body is in a flight state according to a control signal when the required electric power is provided to the electric motor 14 and the electric motor 14 drives the rotor 12 based on the required electric power. The required electric power required in the first state is, for example, an electric power equal to or less than an electric power which can be output by the electric generator 50 corresponding to the other GT 60 when the other GT 60 which has not stopped is operating within an efficient operation range. The required electric power required in the first state is an electric power which exceeds the electric power which can be output by the other GT 60 described above, but may be an electric power equal to or less than the electric power which can be supplied by the storage battery 32. In other words, although the electric power generated in real time is insufficient, the electric power which is the required electric power or more is supplied to the electric motor 14 when an electric power is supplemented from the electric power accumulated in advance in the storage battery 32. The required electric power required in the first state can be supplied from the storage battery 32 when the operation of the GT 60-1 and the GT 60-2 has stopped and an electric power is not supplied to the storage battery 32.

As described above, when the flight state of the flying body 1 is the first state after the GT 60-1 and the GT 60-2 are in operation and the flying body 1 takes off, for example, the control device 100 causes the remaining GT 60-2 to stop while operating the GT 60-1 which is a part of the GT 60-1 and the GT 60-2.

[Details of Gas Turbine Engine]

Figure 4:
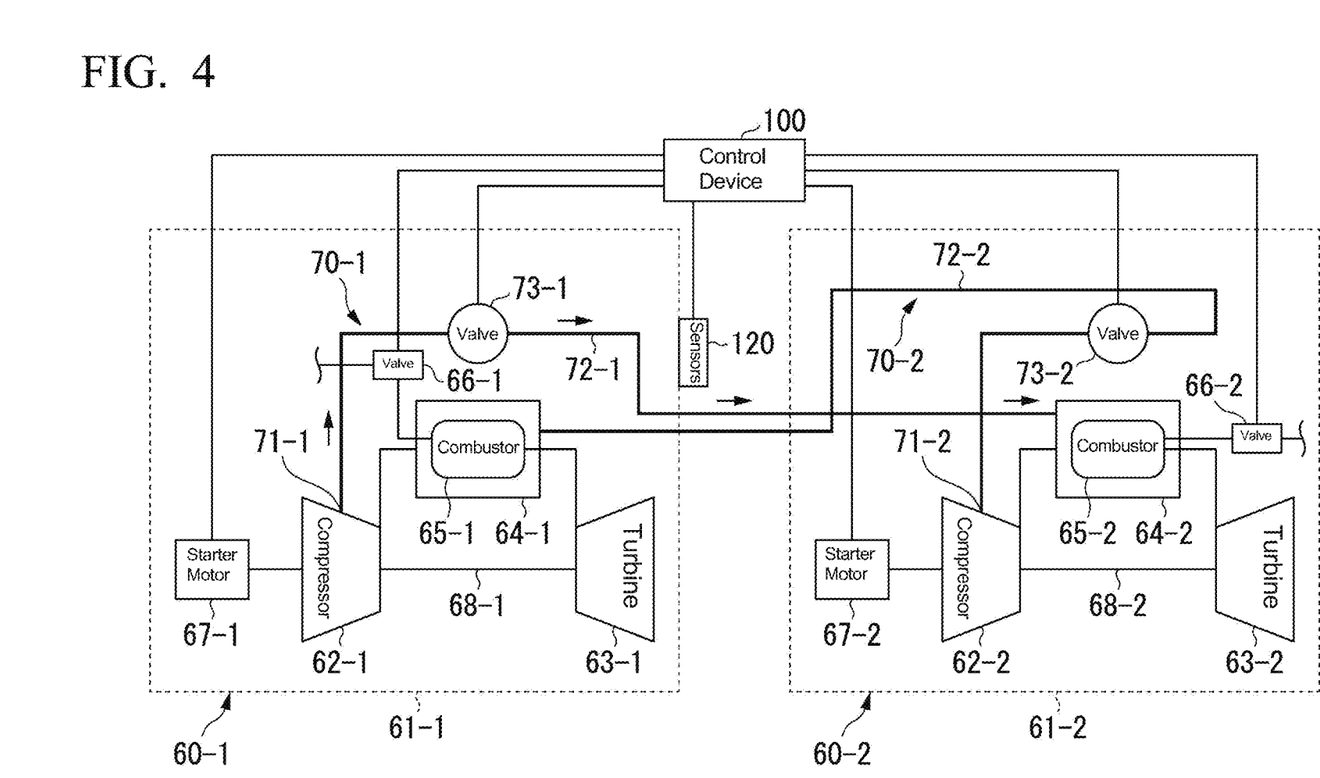
FIG. 4 is a diagram showing an example of a functional constitution of GTs 60-1 and 60-2.

FIG. 4 is a diagram showing an example of a functional constitution of the GTs 60-1 and 60-2.

The GT 60-1 includes a casing 61-1, a compressor 62-1, a compression chamber 64-1 (combustion chamber), a combustor 65-1, a turbine 63-1, an engine shaft 68-1, a starter motor 67-1, a fuel shutoff valve 66-1, and a bleed air mechanism 70-1.

The casing 61-1 has each constitution of the GT 60-1 accommodated therein.

The compressor 62-1 compresses intake air suctioned through an intake port (not shown).

The compression chamber 64-1 is disposed downstream of the compressor 62-1 (a diffuser of the compressor 62-1). The combustor 65-1 is disposed in the compression chamber 64-1.

The combustor 65-1 burns a gas which is a mixture of the compressed air and fuel to generate combustion gas. The compressed air described above is compressed air supplied to the compression chamber 64-1.

The turbine 63-1 is connected to the compressor 62-1 and rotates integrally with the compressor 62-1 due to a force of the combustion gas. The turbine 63-1 and the compressor 62-1 are connected via the engine shaft 68-1.

The engine shaft 68-1 is connected to the electric generator 50-1. A part of the engine shaft 68-1 functions as an output shaft. When the output shaft rotates due to the above rotation, the electric generator 50 connected to the output shaft operates.

The starter motor 67-1 is connected to the engine shaft 68-1 of the GT 60-1. The starter motor 67-1 rotates (idles) the engine shaft 68-1 so that the engine shaft 68-1 is in an operable state when the supply of fuel to the GT 60-1 stops.

The fuel shutoff valve 66-1 switches between supplying and shutting off fuel supplied to the combustor 65-1. The fuel shutoff valve 66-1 is connected to the control device 100. The fuel shutoff valve 66-1 is controlled by the control device 100. When the fuel shutoff valve 66-1 is in an open state, fuel is supplied to the combustor 65-1 and the GT 60-1 operates. When the fuel shutoff valve 66-1 is in a closed state, the supply of fuel to the combustor 65-1 stops and the GT 60-1 stops.

The bleed air mechanism 70-1 sends compressed air of the compressor 62-1 to a compression chamber 64-2 of another GT 60-2. The bleed air mechanism 70-1 includes a bleed air hole 71-1, a bleed air pipe 72-1, and a bleed air valve 73-1.

The bleed air hole 71-1 is installed in the compressor 62-1. The bleed air hole 71-1 communicates an inside of the compressor 62-1 with an outside of the compressor 62-1.

The bleed air pipe 72-1 extends from the bleed air hole 71-1 to the compression chamber 64-2 of the other GT 60-2. The bleed air hole 71-1 communicates the compressor 62-1 with the compression chamber 64-2 of the other GT 60-2. Air compressed by the compressor 62-1 is sent to the compression chamber 64-2 of the other GT 60-2 through the bleed air pipe 72-1.

The bleed air valve 73-1 is provided in the bleed air pipe 72-1. The bleed air valve 73-1 is located downstream of the bleed air hole 71-1. The bleed air valve 73-1 switches communication and interruption between the compressor 62-1 and the compressor 62-1 through the bleed air pipe 72-1.

In the embodiment, the bleed air pipe 72-1 of the GT 60-1 connects the compressor 62-1 of the GT 60-1 to the compression chamber 64-2 of the GT 60-2. Furthermore, a bleed air pipe 72-2 of the GT 60-2 connects a compressor 62-2 of the GT 60-2 to the compression chamber 64-1 of the GT 60-1. That is to say, the two GTs 60 are connected to each other using the bleed air mechanism 70-1.

[Example of Control of Gas Turbine Engine and Bleed Air Mechanism]

An example of control of the GTs 60-1 and 60-2 and the bleed air mechanisms 70-1 and 70-2 will be described below.

In this control, the control device 100 first determines whether the flying body 1 is in the first state or the second state. The control device 100 may determine whether the flying body 1 is in the first state or the second state based on the flight information including an outside air temperature acquired by the various sensors 120 (temperature sensors). Here, the various sensors 120 for acquiring the outside air temperature may be attached to the airframe of the flying body 1 or may be attached to the casing 61-1 of the GT 60-1 (refer to FIGS. 3 and 4). The outside air temperature of the flying body 1 during cruising is, for example, about −45° C.

When the flying body 1 is in the second state such as during takeoff or landing, the bleed air valve 73-1 is closed while both of the GTs 60-1 and 60-2 are operating. For this reason, for example, the compressed air of the compressor 62-1 is not sent to the compression chamber 64-2 of another GT 60-1 via the bleed air mechanism 70-1 of the GT 60-1. Thus, in each of the GTs 60-1 and 60-2, there is no extra pressure loss of the compressed air. As a result, the GTs 60-1 and 60-2 operate stably.

When the flying body 1 is in the first state such as during cruising, the control device 100 causes the remaining GT 60 to stop while operating a part of the plurality of GTs 60 as described above. In the embodiment, for example, the GT 60-2 is caused to stop while the GT 60-1 is operating. At this time, the bleed air valves 73-1 and 73-2 remain closed.

After that, for example, when the flying body 1 is in the second state again, the control device 100 causes the GT 60-2 which has stopped to start up again. At this time, the control device 100 opens the bleed air valve 73-1 in the GT 60-1 which is in operation and supplies the compressed air of the compressor 62-1 in the GT 60-1 which is in operation to the compression chamber 64-2 of the GT 60-2 which has stopped through the bleed air hole 71-1 and the bleed air pipe 72-1. Thus, a turbine 63-2 and an engine shaft 68-2 rotate and the GT 60-2 begins to start up again.

The GT 60-2 which has stopped may start up again using, as a driving force, only the compressed air supplied from the GT 60-1 which is in operation to the compression chamber 64-1. The GT 60-1 which has stopped may start up again using, as a driving force, both of the compressed air supplied from the GT 60-1 which is in operation to the compression chamber 64-1 and the starter motor 67-1.

After the restart up of the GT 60-2 is completed and the engine shaft 68-1 of the GT 60-2 begins to rotate stably, the control device 100 closes a bleed air valve 73-2 again. The determination of a timing for closing the bleed air valve 73-2 (determination that the restart of the GT 60-2 has been completed) can be performed, for example, by the control device 100 based on an internal pressure of the compression chamber 64-1.

As described above, according to the flying body associated with the embodiment, when causing the GT 60-1 which has stopped to start up again, the control device 100 opens the bleed air valve 73-1 in the GT 60-1 which is in operation and supplies the compressed air of the compressor 62-1 in the GT 60-1 which is in operation to the compression chamber 64-2 of the GT 60-2 which has stopped through the bleed air hole 71-1 and the bleed air pipe 72-1. Therefore, the compressed air compressed by the compressor 62-1 in the GT 60-1 which is in operation is supplied to the compression chamber 64-2 of the GT 60-2 which has stopped. Thus, for example, even if a starter motor 67-2 is not caused to rotate the engine shaft 68-2 in the GT 60-2 which has stopped, it is possible to supply compressed air to the compression chamber 64-2. Therefore, it is possible to reduce a rotational load of the engine shaft 68-2. As a result, when the starter motor 67-2 and the engine are utilized together, it is possible to shorten a time required for starting up the engine again. It is also possible to start up the GT 60-2 again without utilizing the starter motor 67-2 and the engine together. In this case, it can be said that a bleed air mechanism 70-2 functions as an engine restart-up mechanism for starting up the GT 60-2 again without a starter motor.

The technical scope of the present invention is not limited to the above-described embodiment and various modifications are possible without departing from the gist of the present invention.

A bleed air mechanism 70 may not be provided in all GTs 60. For example, when the GT 60-1 is caused to operate, the GT 60-2 is caused to stop, and the GT 60 to operate is not replaced in the first state, the bleed air mechanism 70 may be provided only in the GT 60-1.

In addition, it is possible to replace the constituent elements in the above-described embodiment with well-known constituent elements as appropriate without departing from the gist of the present invention and the above-described modified examples may be appropriately combined.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Flying body (aircraft)
10 Airframe
12 Rotor
14 Electric motor
50 Electric generator
60 GT (engine)
62 Compressor
64 Compression chamber
67 Starter motor
68 Engine shaft
70 Bleed air mechanism
71 Bleed air hole
72 Bleed air pipe
73 Bleed air valve
100 Control device (controller)
120 Various sensors (acquisition units)

What is claimed is:

1. An aircraft propulsion system, including:
a plurality of gas turbine engines attached to an airframe of an aircraft;
an electric generator, wherein the electric generator is connected to each engine shaft of each of the gas turbine engines;
a plurality of electric motors driven using electric power generated by the electric generator;
a plurality of rotors attached to the airframe of the aircraft and driven using driving force respectively output by the plurality of electric motors; and
a controller which controls an operation state of the plurality of gas turbine engines,
in which, when a flight state of the aircraft is a first state after the plurality of gas turbine engines operate and the aircraft takes off, the controller causes some of the plurality of gas turbine engines to operate while stopping the remaining engines,
wherein the plurality of gas turbine engines have a compressor that compresses intake air, a compression chamber disposed downstream of the compressor, and a combustor that is supplied with compressed air from the compression chamber,
wherein at least two gas turbine engines of the plurality of gas turbine engines includes:
a bleed air hole provided in the compressor;
a bleed air pipe extending from the bleed air hole of one gas turbine engine of the at least two gas turbine engines to the compression chamber of another gas turbine engine of the at least two gas turbine engines; and
a bleed air valve provided in the bleed air pipe,
when the another gas turbine engine which has stopped is caused to start up again, the controller opens the bleed air valve in the one gas turbine engine which is in operation and supplies the compressed air of the compressor in the one gas turbine engine which is in operation to the compression chamber of the another gas turbine engine which has stopped through the bleed air hole and the bleed air pipe,
wherein the compression chamber contains the combustor,
wherein a first gas turbine engine and a second gas turbine engine are provided as the plurality of gas turbine engines,
wherein the aircraft propulsion system further includes:
a first bleed air pipe of the first gas turbine engine, which connects the compressor of the first gas turbine engine and the compression chamber of the second gas turbine engine;
a second bleed air pipe of the second gas turbine engine, which connects the compressor of the second gas turbine engine and the compression chamber of the first gas turbine engine;
a first bleed air valve, which is only one provided in the first bleed air pipe and which switches communication and interruption between the compressor of the first gas turbine engine and the compression chamber of the second gas turbine engine; and
a second bleed air valve, which is only one provided in the second bleed air pipe and which switches communication and interruption between the compressor of the second gas turbine engine and the compression chamber of the first gas turbine engine.

2. The aircraft propulsion system according to claim 1, further comprising:
   a starter motor which rotates the engine shaft,
   wherein the another gas turbine engine which has stopped is able to start up again using, as a driving force, both of the compressed air supplied from the one gas turbine engine which is in operation to the compression chamber and the starter motor.

3. The aircraft propulsion system according to claim 1, further comprising:
   one or more sensors which acquire flight information associated with flight of the aircraft,
   wherein the controller controls the operation state of the plurality of gas turbine engines based on the flight information acquired by the one or more sensors.

4. The aircraft propulsion system according to claim 1, wherein the first state is a state in which the aircraft reaches a prescribed altitude and then moves in a direction including a horizontal direction.

5. The aircraft propulsion system according to claim 1, wherein, when the flight state of the aircraft is in a second state different from the first state, the controller causes the plurality of gas turbine engines to operate to control the aircraft.

* * * * *